Jan. 25, 1966  I. N. SMITH  3,231,453
BITUMINOUS WEATHERING SHEET INCLUDING CONTINUOUS GLASS
FIBERS AND METHOD OF MAKING SAME
Filed June 8, 1959  3 Sheets-Sheet 1

INVENTOR.
IRVING N. SMITH
BY
ATTORNEYS

Jan. 25, 1966  I. N. SMITH  3,231,453
BITUMINOUS WEATHERING SHEET INCLUDING CONTINUOUS GLASS
FIBERS AND METHOD OF MAKING SAME
Filed June 8, 1959  3 Sheets-Sheet 2

INVENTOR.
IRVING N. SMITH
BY
ATTORNEYS

Jan. 25, 1966 I. N. SMITH 3,231,453
BITUMINOUS WEATHERING SHEET INCLUDING CONTINUOUS GLASS
FIBERS AND METHOD OF MAKING SAME
Filed June 8, 1959 3 Sheets-Sheet 3

Fig. 7

INVENTOR.
IRVING N. SMITH
BY
ATTORNEYS

United States Patent Office 3,231,453
Patented Jan. 25, 1966

3,231,453
BITUMINOUS WEATHERING SHEET INCLUDING CONTINUOUS GLASS FIBERS AND METHOD OF MAKING SAME
Irving N. Smith, San Jose, Calif., assignor to Owens-Corning Fiberglas Corporation, a corporation of Delaware
Filed June 8, 1959, Ser. No. 818,846
12 Claims. (Cl. 161—83)

This invention is related to a new roofing and siding sheet and its manufacture, and more particularly to a waterproof weathering sheet made of a low modulus matrix material such as asphalt incorporating mats of high modulus material such as glass fibers specially located in the product to impart improved strength, dimensional stability, and weatherability over corresponding products heretofore available.

In being one of the lowest cost waterproofing materials available, bituminous materials such as asphalt have been adopted as a standard by the roofing industry for incorporation in weathering protection products such as roll roofing, shingles, and siding. Asphalt of itself, however, lacks certain properties of stiffness, fire resistance, nail-holding properties, and dimensional stability with varying temperature, so that in order to permit its adaptation for roofing and siding materials, it must be combined with other materials to compensate for these deficiencies. To take advantage of the low cost of asphalt, however, materials added thereto to make a practical product must also be of low cost, or alternately must be of such character that if higher in cost, they will provide the desired characteristics with an economically includable amount of the added matter.

In practice, a low cost base material such as rag felt; including scrap paper, cardboard, mechanical wood pulp, etc.; is combined with a low cost asphaltic saturant necessarily of low viscosity in order to permit impregnation of the felt thereby to form the carrier base for the product desired. The rag felt base can be specially treated such as by maceration, but in each instance the saturant or impregnant must be of a character which is adaptable to the thorough combination with the rag felt. Accordingly, the saturant or impregnant is usually selected for its saturability rather than its weatherability. A higher viscosity weathering asphalt is thereafter applied over the rag felt base or carrier, which is selected specifically for its weatherability since it acts as the primary weathering protection for the surface to which the product is applied. Granules are applied over the weathering asphalt to act as a sun reflectant and to provide a rugged surface against scarring of the weathering asphalt surface.

Limits on the life of such a product lie both in the thickness of the weathering surface applied as well as in the degree of inertness and dimensional stability of the saturated rag felt base of the product. Since the base saturant for such a product contains a lower viscosity asphalt, generally of a more volatile nature than the exterior weathering asphalt, and since it is in direct contact with organic matter of wicking character, the saturant or impregnant has an opportunity to dissipate itself at the product edges, especially with aging, while the wicking properties of the rag felt act to convey the internally embedded volatile matter to the edges so that eventually the base or carrier becomes dry and has tendencies to rot. Warping and lifelessness result which permit easy blow-offs of the product under heavy winds.

In view of the foregoing, it is the principal object of the present invention to provide a new low-cost composite asphalt sheet construction adaptable to roll roofing, shingles, and siding products, which construction overcomes the deficiencies of conventional low-cost asphaltic products by incorporating an improved dimensionally stable, fire resistant, longer life carrier base.

Another object of this invention is to provide a new low-cost moisture protection and weathering material which is wind resistant, more fire safe, and more weather resistant than products heretofore available.

It is another object of the present invention to provide a new asphalt composite weathering material including high strength, high modulus matter to compensate for the flowable nature and, accordingly, low dimensional stability of asphalt in available products, especially under conditions of high temperature to which such products are subjected, such as in the direct rays of the sun or in emergency situations such as an accidental burning of a dwelling structure.

It is still another object of the present invention to provide an asphaltic product for moisture and weather protection which, beside being low in cost, has a longevity beyond that of correspondingly commercially available products.

A still further object of the invention is to provide an asphaltic moisture and weather resistant product which includes a high modulus reinforcing material having an improved nail tear-resistance permitting its use as protection for dwelling structures, with strength against winds and a degree of stiffness which minimizes possibilities of blow-off.

In brief, the above objectives are attained according to the present invention by providing a construction of two spaced webs of continuous glass fibers imbedded in an asphalt matrix with an interposed core of asphalt providing the spacing. Mineral granules of conventional type deposited over the weathering surface of the product function as protection against the actinic rays of the sun and provide a more rugged surface to withstand the rigors of installation and subsequent need for load bearing characteristics.

The continuous glass fibers in the present construction may be distributed in the spaced webs as individual continuous fibers or in twisted or untwisted strands to impart concentrations of strength in the product where desired. In the latter sense, improved nail-holding properties can be imparted by concentration of bundles of continuous glass fibers in the zone where nails are passed through to secure the weathering product to the surface to be protected. Concentrations of continuous glass fibers under the nail heads improve tremendously the tensile and tear strength of the product and, accordingly, its tear-resistance and nail-holding properties.

In a broader sense, the present product can be likened to an I-beam structure with webs of glass fibers spaced apart across the thickness of the shingles, siding or roll roofing products. The glass fibers have a high tensile strength and high modulus practically independent of temperature conditions, thereby overcoming a limitation in stiffness of the asphalt itself with variations in temperature. Additionally, the spaced web construction with the glass fibers close to the outer surfaces of the product provides a retaining network for asphalt at the surface and imparts a greater dimensional stability to the surface material than is otherwise possible with the flowable surface of asphalt. The usual surface granules of crushed mineral material are thereby provided a base or nesting zone for at least a partial nesting within the web of the topmost layer of glass fibers, thereby prolonging their life on the product surface.

Since the spaced mats or webs of glass fibers can be relatively thin and still provide the additional strength and dimensional stability to the asphalt matrix, the webs can be extremely porous and readily adapted to allowing saturation or passage of the asphalt therethrough. Accordingly, a higher viscosity asphalt such as a weathering grade asphalt can be utilized throughout the thickness of the product so constructed.

In addition to the above, another feature of the invention lies in the fire safeness imparted to the product by its special construction. Conventional asphalt constructions for roofing materials, upon being subjected to the heat of a flame extending over a period of a few minutes, result in a charring of the surface of the asphalt, which charred surface of itself is highly fire resistant, but due to the heating and swelling of the substrate below the charred surface, crackage of the charred surface usually results with a consequent presentation of fresh asphalt for continued spread of flame over the product surface. The present construction, however, in providing an inorganic non-combustible network of glass fibers immediately under the top surface of the product, provides a base for the charred surface which during spread of the flames prevents opening of the charred matter. Accordingly, the fire resistance of the charred surface, which during exposure to flame becomes progressively more non-combustible, soon results in reduction of the tendency toward sustenance of the flame. Accordingly, if the product surface is the sole base for the flame, it soon causes burn-out, in comparison to continued spread and sustenance of the flame in conventional asphalt products.

Another feature of the invention lies in the adaptability of the product to construction with a degree of stiffness as desired in accordance with the use to which it is to be put. For example, if the construction is to be incorporated in a roofing shingle, a degree of stiffness is desired to assure that it lays properly on the surface to be protected without likelihood of blow-off. In this regard, it is desired that the product be sufficiently stiff that when flipped up, it will return to its natural position so that subsequent gusts will not in all cases cause it to be lifted again. Furthermore, a strength is desired in the stiffened product to the extent that constant gusting of the product, or in other words a constant flapping of the product, will not result in its being weakened beyond its practical protective value. These characteristics are presented in the present product by reason of the adaptability of the construction to being made with different degrees of stiffness, dependent upon the amount of spacing between the glass fiber webs incorporated therein. With a wide spacing of the webs, such as with the webs being at their greatest distance apart at the two major surfaces of the product, the greatest amount of stiffness is attained. This is particularly desirable in the shingle-type construction when the shingle is of thin dimension. On the other hand, when the product is a roll roofing product, a degree of flexibility is desired which will enable a roll-up for ease of shipment and ease of installation as well as ease of conformance to the surface to be protected. In such instance, the amount of spacing between the webs can be reduced to provide greater flexibility than might be desired in the shingle construction. Thus, stiffness or flexibility can be imparted to the construction, dependent upon which is desired.

Products made according to the invention also have a greatly reduced temperature susceptibility. In the usual case, when the temperature is high, the asphalt becomes less stiff and has a tendency to flow, but since the glass fibers have practically no property variation under the ordinary temperatures to which roofing and siding products might be subjected, their incorporation in the asphalt lends greatly to maintaining stiffness at high temperatures as well as providing greater dimensional stability.

The fibrous glass webs in a sense also act as retaining membranes for the asphalt in which they are incorporated. When a rise in temperature occurs, even though the matrix material might have a tendency to flow, the inert fibrous glass membranes act as extended lattice networks with interstices nesting the asphalt near the surface of the product. Accordingly, the degree of flow experienced with products of this type is reduced to the extent that it might be considered as not occurring at all. Thus, once installed, the roll roofing and shingle type constructions of this invention maintain a stable relationship with adjacent abutting and overlapping constructions of similar type and can be relied upon to have a life much greater than conventional asphaltic products.

Another and still further feature of the invention lies in the adaptability of the fibrous glass webs to being impregnated with the asphalt, and accordingly permitting selection of asphalt of a coating grade to be incorporated throughout the thickness of the product. If the base or reinforcing material is of low porosity, then the asphalt must be selected for its capabilities to impregnate or saturate the base or reinforcing material. In the present instance, however, the fibrous glass web need only be of very thin dimensions and, accordingly, can be extremely porous and still provide the reinforcement and retaining characteristics desired, thereby enabling saturation and coating by a wide range of asphalts not necessarily selected for the saturating characteristics, but selected for their weatherability. Long weathering asphalts generally have a high viscosity and do not economically saturate conventional organic rag felt base materials. In the present construction, however, the asphalt incorporated in the product can be the same throughout, and thereby form a matrix of high grade weathering material reinforced at the surface by the glass fiber webs.

The present product construction is also inherently more adapted to receipt of granular mineral materials such as crushed rock granules by reason of the presence of the topmost web of glass fibers which functions to stabilize the exposed asphalt surface. In providing the glass fiber webs in the top surface of the product, the crushed granules can be pressed into the exposed asphalt and caused to be partially nested in the glass fiber web. The glass fiber web is in a sense a lattice network which aids in retention of the crushed rock in position and provides an additional degree of ruggedness and stabilization not present in conventionally available products.

A still further feature of the invention lies in the adaptability of the construction to zonal reinforcement, so that nailing zones can be provided incorporating additional reinforcing fibers to further strengthen the product against nail tear and blow-off. This is accomplished in the present invention by providing additional amounts of continuous fibers in the zone of the shingles where nails are conventionally inserted for securement of the shingle in place against the surface to be protected. The additional amounts of continuous glass fibers under the nail heads assure proper anchorage of the product against the surface to be protected, and an extremely limited likelihood of tear at the nail zone, in view of the extremely high tensile strength of such glass fibers.

A feature of the invention also lies in adaptability of the webs to carry large amounts of asphalt during incorporation of the core of asphalt between the webs in the product forming process. By coating one web of glass fibers with the asphalt, a carrier membrane is formed on which a relatively large quantity of asphalt can be deposited to form a core of the product. The second web can be then applied over the single coated web and core for formation of the sandwich construction. If the fibrous glass web were not of such high strength, the base could not be readily formed without more complicated fabrication and processing means.

A still further feature of the invention lies in the fact that the aforementioned porosity of the reinforcing mat enables use of mineral filled coating-grade or high weathering grade asphalt throughout, thus providing the same excellent weather resistance on the top, bottom, and exposed edges of the roofing construction. Adaptability to use of such asphalt also permits control of hot and cold flexibility. Additionally, since the matrix of the product is 100% weathering grade asphalt, early embrittlement and strength loss as well as skidding due to the usual low softening point of the conventional saturant is eliminated.

The invention will be further described in connection with the drawings, in which.

Figure 1:
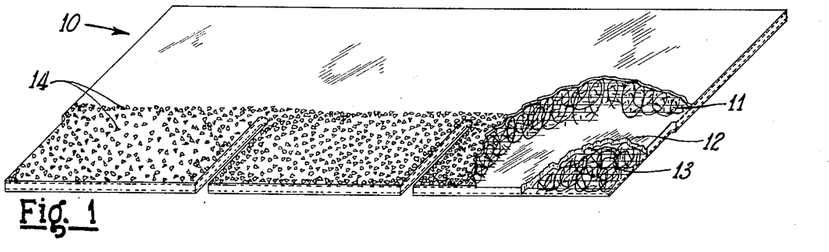
FIGURE 1 is a partly broken away isometric view of an asphalt shingle reinforced with glass fibers in accordance with the concept of the present invention.
Figures 2, 4:
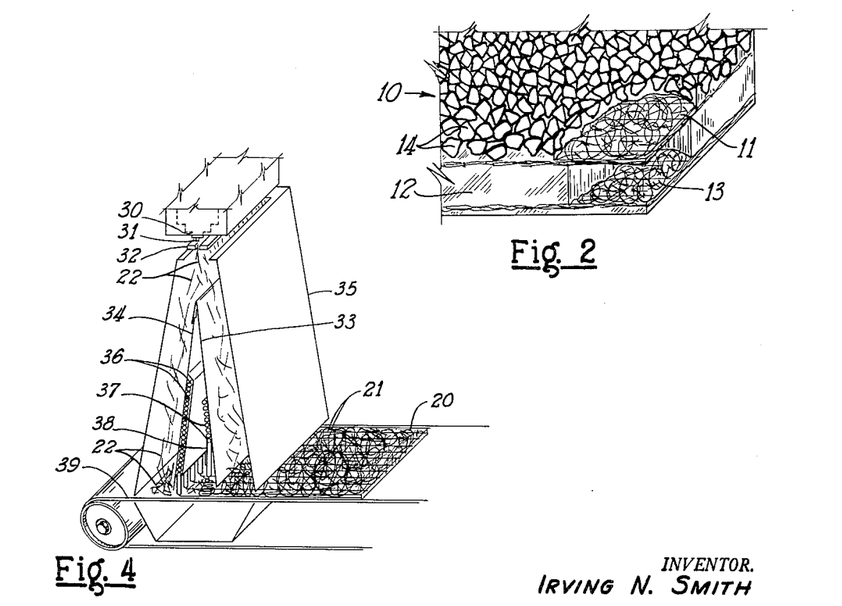
FIGURE 2 is a partly broken away elevational view of the shingle of FIGURE 1.
FIGURE 4 is a partially broken away side elevational view in perspective of apparatus for producing the type of mat illustrated in FIGURE 3.

In greater detail, the shingle 10 of FIGURES 1 and 2 is made of a weathering grade stabilized asphaltic material 12, the asphalt being of stabilized type by having been combined with a stabilizer such as black slate to improve weatherability and dimensional stability under erosive weathering forces. Webs or mats 11 and 13 of glass fibers are spaced apart in parallel relation across the thickness of the construction a distance selected for the degree of stiffness desired in the product. As herein illustrated, the webs are located near the bottom-most and top-most surfaces of the product and thus produce somewhat of a sandwich construction but with the asphalt 12 enclosing both webs in the construction while granules 14 of glazed crushed stone or other suitable mineral material are set in the asphalt overlying the top-most layer or web of glass fibers.

When the overall product dimension is relatively thin, it has been found desirable that the glass fiber webs 11 and 13 be spaced as far apart as possible in order to impart the maximum stiffness possible with the given components incorporated in the shingle. The usual asphalt, of itself, lacks the dimensional stability and stiffness desired in shingles to resist the constant force of uniform winds or the erratic action of gusts of wind blowing thereagainst. Additionally by so locating the webs in the product, the top-most web immediately under the exposed surface of the product offers a more stable asphalt surface in which the granules 14 can be solidly fixed, thereby improving the capabilities of the construction to hold the granules in place under various weather conditions, as well as assuring a longer life for surface asphalt against the damaging action of the sun's rays and of water. The top-most glass fiber mat 11 furthermore acts somewhat as a retainer for the underlying asphalt and consequently is in a sense a fire barrier in cases where the product is subjected to high temperatures such as during a fire occurring in the vicinity of the surface to be protected. In this way, the uppermost web of glass fiber 11, besides acting as reinforcement and as a stabilizing means for support of the granules 14, also advantageously stabilizes the asphalt at the surface against motion during emergency conditions experienced in use. Additionally, since the matrix 12 is of weathering grade and extends throughout the thickness of the construction, life of the product against erosion is greatly increased.

The bottom-most glass fiber mat or web 13 acts in conjunction with the top-most mat 11 to impart strength to the product against its being ripped from the nails used to secure the product to the surface to be protected. The presence of two layers of glass fibers within the construction, each layer having the glass fibers as high tensile strength elements extending under the nailheads themselves, provides strength against pull of the product up and over the nailheads, thereby minimizing the possibilities of tearing of such constructions from the securing nails due to wind and the usual forces of the elements. The bottom-most web, in addition, increases the stiffness of the construction as described above and in this respect, it is preferred, especially in a relatively thin shingle construction, that the web 13 be as close to the bottom surface as possible so as to assure the maximum spacing from the web 11. This increased stiffness offers resistance against flapping due to the wind. The bottom-most web 13 however, performs an additional function to be described hereinafter in relation to the process by which the product is made.

Figure 3:
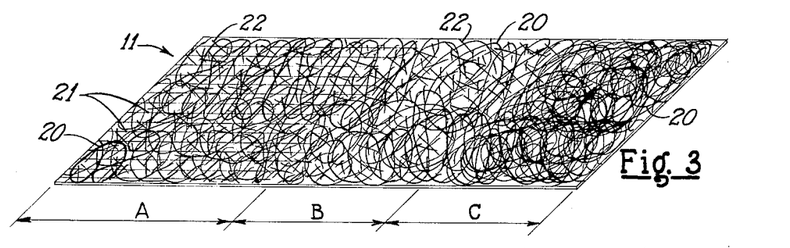
FIGURE 3 is an illustration of a type of mat or web of glass fibers incorporated in the construction of FIGURE 1 and illustrating in three different zones the three arrangements of glass fibers adaptable to incorporation in such a mat.

FIGURE 3 illustrates the type of mat adaptable to incorporation in the construction of FIGURE 1. The glass fiber mat 11 includes glass fibers in three different arrangements, namely, glass fibers in the form of strands or yarns aligned in relatively straight parallel relation extending along the length of the mat, as well as randomly distributed continuous strands or yarns each of a plurality of continuous glass fibers extending over the major dimensions of the product. Additionally, discontinuous individual glass fibers are randomly distributed throughout the major dimension of the product. For tensile strength in the roofing construction in which the mat is incorporated, the continuous strands of glass fibers are most desirable whether randomly or parallelly oriented in the mat. In both instances, the strands are either twisted or untwisted, but include a bundle of continuous parallelly aligned glass fibers running for the full length of the strand. It is well established that individual glass fibers have shown tensile strengths up to 1,000,000 lbs. per square inch in laboratory tests and are commercially available with strength in the order of 300,000 to 400,000 lbs. per square inch. Accordingly, bundles of these individual glass fibers in the form of strands or yarns incorporated in the mat impart a high reinforcing strength to matrices in which they are incorporated.

Section A of FIGURE 3 illustrates the appearance of a mat incorporating the parallel and random continuous glass strands, as well as the discontinuous glass fibers utilized to produce the product of FIGURE 1. Regardless of the form in which these mineral fibers are incorporated in the asphalt, they act as a filler as well as a reinforcing stabilizer against thermal and mechanical forces to which the asphalt might be subjected. Section B of FIGURE 2 illustrates the combination of continuous glass fibers in the form of strands and discontinuous glass fibers with the parallel strands omitted. Section C illustrates still another section and type of mat which can be utilized successfully in the present construction in which both the discontinuous and parallel strand fibers are omitted. All three sections of FIGURE 3 represent types of mats which can be incorporated in the roofing constructions of this invention, but as herein illustrated and as described in relation to the process by which the product is produced, the type of mat of Section A incorporating all three forms is preferred. The basic functioning elements of the mats of this invention, however, are illustrated in Section C of FIGURE 3.

FIGURE 4 illustrates the method and apparatus by which the mat of the composite type including each of the fibrous elements shown in Section A of FIGURE 3 is produced. In this arrangement, a feeder or bushing 30 is associated with a source of molten glass, such as the forehearth of a melting tank, and streams of the glass are flowed from tips 31 of the feeder whereupon the turbulent forces of a set of blowers 32 act on opposite sides of the streams to disrupt them into discontinuous fibers 22. The discontinuous fibers 22 move downwardly under the influence of gravitational forces in addition to the forces of air flowing to the lower pressure zone established below the underlying foraminous conveyor 30 on which the fibers are deposited. The fibers are guided downwardly to the conveyor within a hood 35 surrounding the zone below the blowers 32. A separating partition 33 located below the blowers 32 dissect the space under the blowers so that the fibers 22 are divided into two moving masses or groups of fibers, namely a front group and a back group, which on subsequent deposition on the conveyor 39 form the top and bottom portions respectively of the final mat product.

The separator or partition 33 is a narrow elongated tent-like construction with its apex located in the upper portion of the hood in the fiber forming zone. The separator provides a space over the conveyor from which the continuous glass strands are supplied for deposition on the conveyor between the bottom and top layer of discontinuous glass fibers. The randomly distributed continuous glass strands 20 are blown into the separator space from creel mounted packages (not shown) disposed exteriorly of the hood and are randomly distributed therein over the underlayer of discontinuous fibers 22, whereupon the mass is moved forwardly by the conveyor 39 for receipt of the overlayer of intermingling discontinuous fibers at the forward part of the separator zone. In the underlying space within the separator the parallel strands 21 are also supplied for deposition on the conveyor 30 from tubes 36 leading from packages of the continuous strand (not shown) on a creel disposed laterally at the exterior of the hood 35. These strands are initially introduced into the mat-forming process by being blown against the conveyor 39 whereupon the blowing action is halted and continued movement is maintained due to frictional adherence of the strand to the moving conveyor which draws the strands through the tubes 36 from their source located laterally of the hood but not shown herein. Thus, the parallel strands 21 are laid on the conveyor by reason of movement of the conveyor while the randomly distributed strands 20 are blown thereon at a linear rate greater than that of the conveyor 39.

To assure that the strands 21 are properly deposited on the conveyor 39 without interentanglement in the process of transfer from their source to the conveyor, they are arranged to be supplied from side-by-side aligned tubes 36 located in a separate zone 34 in the back portion of the separator 33. The randomly distributed strands 22, on the other hand, are ejected from the blowing tubes 38 which effect their distribution in random arrangement within the wider space of the separator 33. A wide distribution of the randomly distributed strands 22 is effected by locating the ejecting ends of the tubes 38 some distance above the conveyor, which for example may be in the order of 9" to 12" above the conveyor, while the paralled strands 21 which are desirably deposited in more exactingly spaced relation from each other, are supplied from the open ends of tubes 36 located within ⅛" above the conveyor 39.

The entire mass of fibers is supplied with a binding agent from a source adjacent to the hood 35 (not shown) and is then conveyed through a curing oven (also not shown) to effect the drying and/or curing of the binding agent for fully integration of the fibers into the mat. The binding agent may be any suitable material preferably a thermosetting agent, having fiber holding properties in temperature ranges above those to which the final product is likely to be subjected in use. In this respect, phenolic binders, comprising 12% to 25% of the mat, have proven successful in having a curing temperature in the range of from 300° to 400° F. and the capability of maintaining the interbonded relation for appreciable periods at temperatures in the order of 400° F. Accordingly, the integral relation of the fibers as a retaining member in asphalt or other bitumen materials of the present invention is highly effective for practically all temperatures to which the product might be subjected in normal usage. The modulus of elasticity of glass fibers is in the order of from 10 to 12 million and accordingly, it is highly effective in increasing the overall stability of the bitumen construction which has a modulus of elasticity a considerable extent lower than the glass fibers.

By way of example rather than limitation of the invention, mats which have performed successfully for the purposes of this invention have been produced with a thickness of about 10 mils including discontinuous fibers having an average diameter of 60 hundred thousandths inch and a length of from approximately 3 inches to a few feet, while the continuous fibers in bundles or strand-like form comprising about 30% of the mat by weight have a nominal diameter of 30 hundred thousandths inch. One type of strand commercially available for such purposes contains 204 filaments twisted approximately one turn per inch. The strands, however, can be either twisted or untwisted, and in the case of either, a dispersion or separation between the filaments within the bundle can be provided to impart a finer texture to the mat and an intermingling interengagement to effect a bridging of the fiber gaps that might occur across the expanse of the mat. In this respect, strands such as described in the Frickert Patent 2,736,676 can be incorporated in the mat as well as that shown and described in the Frickert et al. Patent 2,875,503. The mat can be made fully of such fiber-dispersed strands without need for discontinuous fibers if desired. In referring to a strand it is to be recognized that the construction of this invention is not limited to untwisted groupings of the continuous glass fibers, but can also be twisted groupings of such fibers, as well as twisted and plied groupings or yarns. The term "strand" as utilized in describing the invention is therefore herein meant to refer to each such form of groupings of glass fibers.

Figures 5, 6:
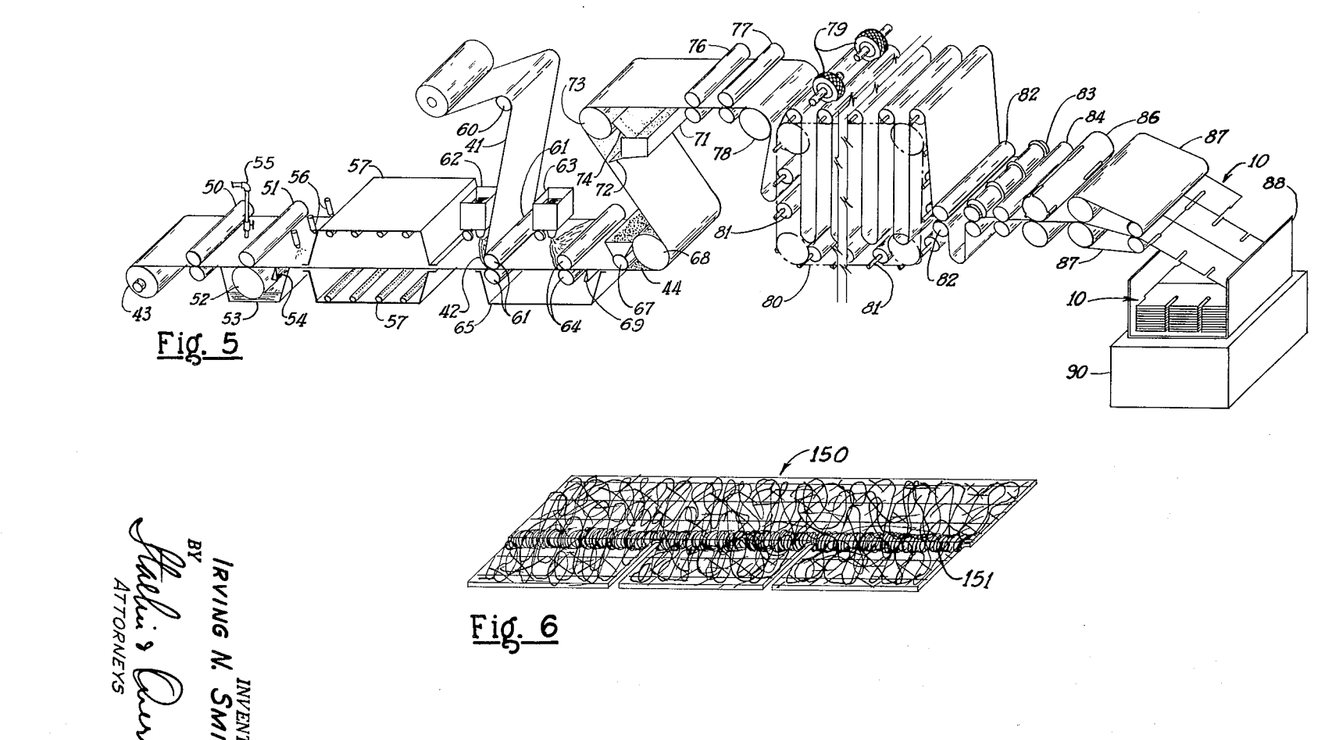
FIGURE 5 is a schematic isometric view of the method and apparatus by which the product of FIGURE 1 is produced.
FIGURE 6 is an illustration of another type of mat which can be incorporated in the construction of FIGURE 1 to produce the novel results of the present invention.

FIGURE 5 shows the apparatus and process by which the roofing material of the present invention is produced. Although described in relation to production of shingles, the process and apparatus is readily adapted to production of siding and roll roofing products as well, including asphalt and other suitable thermoplastic weathering materials.

A flexible glass mat 43 of the type illustrated in FIGURE 3 produced by the method and apparatus of FIGURE 4 is withdrawn from a supply roll by a pair of feed rolls 50 and is then passed through a pair of coating squeeze rolls 51 and 52 which apply a coating of asphalt thereto for impregnation completely through the thickness of the web or mat. The roll 52 is of dimension such that it dips down into a pool of molten asphalt maintained at a predetermined level in a reservoir 53 disposed below the web and picks up a quantity of asphalt therefrom for application to the underside of the mat 43. A portion of the asphalt passes through the porous mat and a nip or small globular quantity is formed on the underside of the mat at the bite between the rolls 51 and 52, while because of the freedom of the asphalt to pass through the porous mat, a somewhat smaller nip is also formed on the upperside of the mat at the bite between the rolls 51 and 52, whereupon continued movement of the mat between the rolls causes a squeezing and a metering of the amount applied to the mat. Although this step in the operation might be termed a mat coating operation, the asphalt is impregnated through to the upper sides from the underside of the mat. Additional asphalt can be deposited directly onto the upper side of the mat from a source 55 when desired or necessary to assist in effecting a more uniform distribution on the upperside of the mat as determined by the flow and penetrating characteristics of the asphalt used. In order to prevent excessive amounts of asphalt from being applied to the undeside of the mat, however, a wiping knife or blade 54 is provided extending transversely across the width on the underside of the mat following the squeezing, coating, and impregnating operation performed by the rolls 51 and 52. The blade 54 removes excesses of asphalt from the underside of the mat and meters the quantity applied to the underside to the degree desired. In most instances this mat is desirably provided with a minimum of asphalt on the underside but with a sufficient amount to cover the glass fibers as protection therefor. The asphalt in the reservoir 53 is maintained molten and fluid to a desired degree at a temperature in the order of 380° F., and accordingly, upon advancement of the coated and impregnated mat 53 beyond this zone for further processing, it is desirable that the mat be cooled.

It is a feature of this invention that the bottom reinforcing web or mat is cooled to a degree that molten asphalt subsequently deposited thereon will not flow through the web by melting the coating and impregnating material prior to complete assembly of the product. This cooling is accomplished by first subjecting the impregnated mat to the chilling action of a coolant such as water supplied by a set of sprays 56 spaced above and across the width of the mat from which a mist of the coolant is distributed in the zone immediately following the coating operation. The mat is then further cooled and set by air circulated between a pair of air cooling hoods 57 disposed above and below the mat in the zone immediately following the spray cooling step prior to its being supplied with additional asphalt in a subsequent core forming step. The mist from the coolant spray 56 effects an initial chill while the air cooling hoods which extend over a greater length of the path of the mat effects the major penetrating and more gradual cooling by circulating air above and below the mat.

Upon further advancement of the cooled mat, additional molten asphalt 42 is deposited thereon from a metered asphalt supply source 62 located above the mat. The asphalt is supplied in a sufficiently fluid condition and from a sufficient distance above the mat that it spreads across the width of the mat to form a core for the product as it is advanced, whereupon a second mat of glass fibers, drawn by a pair of squeeze rolls 61, is applied directly over the newly spread asphalt core by passage immediately under the uppermost squeeze roll 61. The squeeze rolls 61 are disposed a distance apart selected for the thickness desired for the core of asphalt and are located in a position with respect to the asphalt supply 62 such that they act in conjunction with the natural spread of the asphalt to squeeze excesses to the edges of the assembled composite. Excesses squeezed from the edges are deposited in the overflow container 65 located under the squeeze rolls 61. The coated mat or web 43 being in a relatively cool, solidified condition is able to withstand the weight of the added molten core asphalt 42 and offers a base arranged by its mass and degree of cooling such that it does not become sufficiently heated by the added molten asphalt to allow the core material to flow therethrough.

The parallel strands in the mat of the present construction improve the tensile strengths of the sheet during processing in production wherein each mat acts as a tensioning element permitting drawing of the sheet through the apparatus of the production line. The parallel strands additionally act somewhat as a base for bridging of the asphalt across the width of the sheet during the process of assembly of the product. That is, the gaps between the parallelly aligned tensioning strands are sufficiently small that the bitumen matrix deposited thereon acts in bridged or webbed relation across the gaps. The intermingled discontinuous fibers are also bridged across the gaps of the parallel strands, as well as being interbonded in integrated relation across the randomly distributed strands which extend in criss-cross relation about the extended parallel strands. By this means, gaps or voids of fibers in the mats are minimized while yet providing a porosity permitting relatively free passage of the fluid bitumen therethrough.

The mat of glass fibers 41, in passing under the topmost squeeze roll 61 and acting in compression against the core material on the base web has an amount of the core asphalt squeezed therethrough so that upon advancement of the assembly from between the squeeze rolls 61, a thin layer of asphalt is present over the fibers of the mat 41. A top overlayer of asphalt is thereupon deposited over the top-most mat supplied from a source 63 located above the assembly in the manner of the supply of the core asphalt 62. The material so supplied is spread over the width of the assembly and is passed between a pair of metering rolls 64 disposed above and below the assembly a distance just sufficient to provide the thickness desired to produce a shingle construction of predetermined thickness. Excesses of the overlayer of asphalt are squeezed from the edges of the assembly and into the oversupply container 65 for subsequent recirculation.

A wiping blade 69 is disposed on the underside of the assembly which makes contact with the underlayer of asphalt subsequent to passage through the metering rolls 64 to wipe any excesses of asphalt that might have passed to the underside. The amount of asphalt in the assembly prior to deposition of additional amounts from the sources 62 and 63 respectively, however, are such that upon cooling, the added amounts are arranged to be insufficient to convey heat to the bottom web to an adequate degree to cause excessive weakening of the lowermost asphalt web reinforced by the mat 43, and accordingly, the dripping of asphalt through the web is unlikely. The presence of the blade or wiper 69 therefore is precautionary for wiping of excesses squeezed from between the final metering rolls 64 in order to assure that the bottom-most mat 63 is located as close to the bottom of the assembly as possible.

The usual protective and decorative mineral granules such as crushed stone are thereupon deposited on the upper layer of weathering asphalt exposed after passage through the metering rolls 64. The granules 44 are supplied from a hopper 66 and are metered over the exposed asphalt surface of the assembly by a fluted feed roll 67 disposed immediately below a granule supply hopper 66. A multiple hopper applicator for blended colors can be used as a replacement in this stage of the process if desired. Rotation of the fluted roll 67 is matched to the forward movement of the conveyor line to assure an even supply of granules over the entire length of the assembly.

The granuled construction of asphalt and glass fibers is then advanced under and around a driven slating drum 68 which acts to partially set the granules into the asphalt of the exposed surface upon which they are deposited, while excesses of the granules which are not thereby adhesively secured to the assembly are dropped into the hopper 66 by reason of the overturned relation of the sheet after passage about the slating drum 68. A parting agent such as mica particles 72 are deposited on the underside of the roofing sheet after passage over the slating drum 68. The mica is supplied from a hopper 71 which feeds a quantity of particles to a vibrating inclined surface member 70. Although mica is herein described as being used as the parting agent, it will be recognized that any number of materials can be utilized to provide the desired nonsticking character in the final product. Sand is another type of material adapted to use for this purpose.

After supply of the parting agent to the back of the sheet the continuous composite sheet is advanced about a turnover drum 23 which more permanently fixes the parting agent to the back of the construction. Excesses of the parting agent are wiped from the drum 23 by a transverse member 74 and are redeposited on the vibrating surface member 70. The final assembly of components for this sandwich construction is then advanced through two pairs of press rolls 76 and 77 aligned in series for final dimensioning and setting of the granules in the topmost surface of the construction. After passage through the press rolls 76, the continuous sheet is passed over a guide roll 78 prior to being formed into loops to allow more gradual cooling of the sheet than would otherwise be possible at the speed of production of the construction.

After advancing over the guide roll 78, the sheet or composite web of material is moved onto a moving roller conveyor made up of a series of parallelly aligned slowly advancing rolls 80 extending transverse to the width of the sheet. The portion of the sheet in engagement with the second roll 80 of the conveyor is pinched between the second roll and a pair of stationarily disposed spaced wheels or tires 79 which slows the advancing movement of the pinched portion and accordingly forms a loop between the first and second rolls 80 of the conveyor. Continued advancement of the second roll under the wheels or tires 79 advances the newly formed hanging loop of the composite web past the wheels 79 placing it in series with the preceding loops on the conveyor line. In view of the web so being slowed in its linear advancement to subsequent cutting and packaging operations, it is provided an opportunity to cool slowly to a more stable condition for the further processing.

The rate of advancement of the rollers 80 relative to the rate of advancement of the sheet during its fabrication determines the length of the loops 81, and accordingly, the time allowed for cooling of the web following fabrication.

The relative rates between fabrication and cooling of the web is regulated so that it is fully stabilized upon subsequent slitting, cutting and packaging. At the end of the line of rollers 80, the composite web is withdrawn from the last of the series of loops 81 by a pair of pulling rolls 82 for feed thereof to a pair of slitter rolls 83. The rate of withdrawal of the web by the pull rolls 82 can be regulated to provide a short additional loop 85 before the slitter rolls 83, thereby reducing the requirement for an exactingly matched speed relation between the slitter rolls 83 and the pull rolls 82. Tension problems for cutting the sheet are thereby minimized.

The slitter rolls 83 effect a severance of the web into three equal widths which are retained in side-by-side abutting relationship, in which relationship they are drawn through a pair of measuring drive rolls 84 for passage to a pair of driven cutting rolls 86 which effect a cutting of each of the parallelly moving strips of the web to form shingles of the general shape illustrated in FIGURE 1.

After being cut, the shingles are received by a pair of feed belts 87 which supply the shingles into stacked relation on a stacking plate 88 on a packaging bed 90 for strapping and final shipment.

By way of further example, successful sheets so produced have had a thickness dimension in the order of 125 mils with a spacing between 10 mil glass fiber webs in the order of 75 mils. In other words, the desired stiffness is imparted to the sheet with the spacing between webs being approximately 60% of the sheet thickness and the ratio of spacing to mat thickness being 7.5 to 1. The mats comprised approximately 2 to 4% by weight of the sheet while the core therebetween made up approximately 50% by weight of the sheet. Asphalt saturant in the lower mat comprised 4% and the top coat asphalt 10% of the product. Surface granules were about 32% and parting agent 1.5% of the product weight. The range of mat thicknesses can extend at least from .005" to .05" while spacing can be from .010" to .200". Discontinuous fiber diameters can be in the range of .0001" to .002" and continuous fibers from .0002" to .001". The weight of the two mats can range from .01 to .1 lb. per foot and from 1 to 20% of the product weight. Asphalt incorporated therein containing 200 mesh stabilizing slate particles or similar suitable mineral material in the order of 50% by weight of the asphalt has been found to provide excellent stiffening and weathering characteristics.

Although the shingle herein described is shown with strands extending lengthwise of the product, it will be noted that this is dependent upon the direction in which the shingle is cut from the sheet on the production line. The lengthwise extension of parallel strands in two spaced mats imparts an additional resistance to bending in such direction which aids in resisting lateral winds where the product is installed. The shingle can also be cut in a direction so that the parallel strands extend across the width of the product, thereby promoting a right angular wind resistance and stiffness in the width direction by reason of the presence of fully extended strands spaced from each other across the width of the product.

Although the method and apparatus is described above in relation to the production of asphalt shingles, it will be recognized that if desired, they are also readily adapted to production of a roll roofing product of the composite web of asphalt, glass fibers and granules. In this respect, the roll roofing product is usually desired to be more flexible than shingles in that the sheet must be rollable and is desirably conformable to variations in contours of surfaces to which it is affixed. Accordingly, the stiffness of the product web is desirably modified for the less stiff condition. As indicated above, the spacing of webs across the thickness of the product, if reduced, will allow more flexing with less stiffness, but additionally, the type of asphalt incorporated in the composite web can also be modified to provide a greater or lesser degree of stiffness. Thus, both the spacing of webs and the type of asphalt are factors which will allow formation of an end product in accordance with predetermined needs.

In view of the penetrability of the coating grade asphalt in the composite structure of this invention, the asphalt can be selected for its weatherability and stiffness rather than being limited to its compatibility with saturant asphalts of the conventional base felt, material, or to one which necessarily at least partially penetrates such base felt. In conventional manner the asphalt of the present structure is combined with a hot slate dust prior to application and combination in the structure, but the degree of slate dust incorporated in the asphalt is not limited to conventional amounts, thereby permitting a combination which as a mixture is more stable and selectable for weatherability.

The presence of a glass fiber mat in the weathering zone of the product causes the glass fibers to act as a reinforcement as well as a barrier for retention of the weathering components of the product. Studies indicate that glass reduces flowability and the coefficient of expansion and increases the elastic properties of the asphalt in the weathering zone. Furthermore, whereas the actinic rays act to cause the surface asphalt to become more water soluble, and the asphalt is therefore subject to being washed away with rain, snow, etc., the presence of glass in the weathering zone imparts a stability against cracks and corresponding degradation below the surface, thereby increasing the longevity of the product.

Additionally, since the porosity of the mats incorporated in the composite structure allows a wide range of asphalt to be incorporated therein, it also enables the use of new types of asphalt, such as the thermosetting compounds such as those made up of epoxy and asphalt. The porosity of the mats furthermore allows a wide range of binding agents to be used for the mat fibers themselves in that the binder does not act as a barrier to the passage of asphalt therethrough. The so-called thermosetting asphalts can also be utilized as a binder for the glass fibers of the mats in the structure. In this respect, some of the thermosetting asphalts have been shown to have weatherability more than three times that of the conventionally stabilized asphalt. Accordingly, the use of such thermosetting asphalt can further promote the longevity of the product in use.

Although highly desirable for combination with other materials, the porosity of the glass fiber mats incorporated in the product may in some instances be a negative factor in the provision of nail holding power of the product.

To alleviate this condition and accordingly to provide a greater reinforcement in the zone of nailing of the roofing material, it has been found desirable to provide a concentration of continuous strand in the nailing zone. FIGURE 6 illustrates a mat incorporated in a shingle such as that of FIGURE 1, wherein a concentrated zone of continuous strand is provided in the nailing zone 151. The mat 150 is of the same general type as illustrated in FIGURE 3, but along its length in the zone where nails are passed through to secure the product to the surface to be protected, a concentrated strip of randomly deposited continuous strand in the order of 2 to 3 inches wide, generally near the center of the shingle width, provides a degree of reinforcement of continuous strand which will impart the degree of nail holding power desired.

Figure 7:
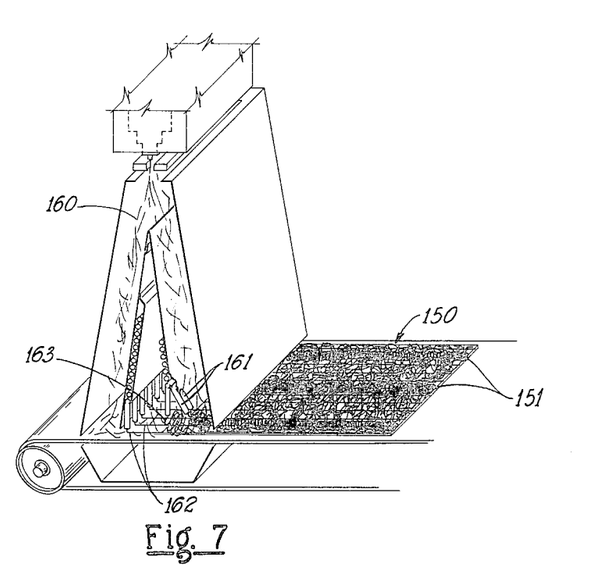
FIGURE 7 is a partially broken away side elevational view in perspective of the method of apparatus by which the mat of FIGURE 6 can be produced.

The mat 150 so composed is made on a production line operation similar to that of FIGURE 4 wherein discontinuous fibers 160, as shown in FIGURE 7, are gravitationally and suctionally moved through a hood and are separated by a tent-like separator to deposit a portion thereof in the back part of the hood with the remainder at the forward part of the hood, while parallel strands 162 and random strands 163 are deposited from within the space of the tent-like separator between the two layers of discontinuous fibers 160. To provide the desired reinforcement of continuous strand 151, three pairs of extra strand blowers 161 are provided in spaced zones across the width of the mat being produced. The spacing is such that the concentration of continuous strands supplied by the extra blowers 161 is centrally located in the finally severed strips from which the shingle structure is subsequently made. A feature of this arrangement is that the strand can be of the same general type utilized in reinforcing the shingle or roofing product or, if desired, can be of still another type of material. Still further, it can be either a twisted or untwisted strand separately selected specifically for nail-holding characteristics. Thus, the general reinforcement and stiffness characteristic can be provided by one type of fiber, whereas the nail-holding characteristic can be imparted by still another. Preferably, however, the strand or yarn incorporated for the nail-holding properties is a continuous glass fiber strand because of its high tensile strength which successfully imparts the nail-holding property desired.

Whereas the structural product herein described is illustrated with two mats of glass fibers spaced from each other in the composite structure, it will be recognized that the principal improved weathering characteristics of the structure result from the presence of the top-most mat of glass fibers in the product, whereas the bottom-most web or mat of glass fibers adds stiffness and stability to the whole structure, as well as a stronger nail-holding property. The bottom-most web has a greater degree of flexibility in selection and can in some instances be other material than a glass fiber mat. In this respect, the bottom-most layer can be selected specifically as a carrier for the combination of materials deposited thereover, and accordingly may be different in construction and material from the top mat. It is preferable, however, that the bottom-most web be made of material of inert character such as glass fibers to promote the longevity thereof, since webs of organic matter usually absorb moisture which shortens the life of the product and makes it less effective as a moisture protective sheet.

Although the invention is herein described in relation to the specific forms and embodiments thereof, it will be understood from the foregoing that modifications and variations may be effected in the method, apparatus, and product of the invention without departing from the concepts thereof, and I, therefore contemplate by the appended claims to cover all such modifications as fall within the true spirit and scope of my invention.

I claim:

1. A weather resistant sheet unit for roofing, siding, shingles and the like comprising a unitary matrix of coating grade weathering asphalt and a pair of parallelly spaced separate individually integrated porous webs of continuous glass fibers separated from each other across the thickness of said sheet by an interposed layer of said matrix material, said webs being relatively thin and fully impregnated by and enclosed within said matrix material with the uppermost web reinforcing the top surface of said sheet, said webs each comprising said continuous fibers grouped in strandlike form and randomly oriented therein.

2. A weather resistant sheet unit for roofing, siding, shingles and the like comprising a weathering grade single asphalt matrix, a pair of individually integrated glass fiber mats relatively thin compared to the thickness of said sheet, said mats being coextensive in dimension with said sheet and being parallelly oriented in fully impregnated and enclosed relation within said matrix material but in spaced relation across the thickness of said sheet, each said mat comprising randomly oriented textile strands of continuous glass fibers and randomly intermingled discontinuous individual glass fibers, said fibers being interbonded in integrated relation in their respective mats by a thermosetting resinous binding agent, the top-most of said mats being disposed immediately adjacent the exposed upper surface of said sheet to reinforce said upper surface, and a layer of granules of mineral material set in the reinforced upper surface of the asphalt of said sheet.

3. A weather resistant sheet unit for roofing, siding, shingles and the like comprising a weathering grade asphalt matrix, a pair of glass fiber mats relatively thin compared to the thickness of said sheet, said mats being coextensive in dimension with said sheet and being parallelly oriented and fully impregnated by and enclosed within said matrix asphalt material but in spaced relation across the thickness of said sheet, each said mat comprising randomly oriented textile strands of continuous glass fibers and randomly intermingled discontinuous individual glass fibers, said fibers being interbonded in integrated relation in their respective mats by a thermosetting resinous binding agent, the top-most of said mats being disposed immediately adjacent and reinforcing the exposed upper surface of said sheet, and the bottommost of said mats being disposed immediately adjacent reinforcing the bottom surface of the sheet, with the dimension of the matrix therebetween being greater than the thickness of either of said mats.

4. In combination in a roofing sheet unit an exposed upper surface comprising a weathering asphalt material extending at least partially through the thickness of said sheet, and a coextensive porous mat of continuous fibers grouped in strand-like form and randomly oriented within said mat, said mat being disposed within said asphalt in fully impregnated relation by said asphalt below but immediately adjacent the exposed upper surface of the sheet, said mat also having a reinforced nailing zone extending generally parallel to an edge of said sheet and in a portion of said sheet where nailing is effected to secure it to a surface to be protected, said nailing zone comprising a strip of additional randomly oriented glass fibers concentrated in number to a sufficient degree greater than the general degree of concentration of glass fibers in said mat to impart appreciable nail pull resistance to said sheet in said zone.

5. A weather resistant sheet unit for roofing, siding, shingles and the like comprising a matrix of a single weathering asphalt, a pair of parallelly spaced webs of glass fibers separated from each other across the thickness of said sheet, said webs being fully impregnated by and enclosed within said matrix material and being dimensionally coextensive with said sheet, each said web comprising continuous glass fibers in the form of randomly oriented textile strands, and each of said webs having a strip of additional randomly oriented glass fiber strands providing a high concentration of fibers in a zone of said sheet where nailing of the sheet is effected to secure the sheet to the surface to be protected said concentration of fibers being such as to appreciably increase the nail pull resistance of said sheet in said zone.

6. A weather resistant sheet unit for roofing, siding, shingles and the like comprising a weathering grade asphalt matrix, a pair of individually integrated glass fiber mats relatively thin compared to the thickness of said sheet, said mats being coextensive in area dimension with said sheet and being parallelly oriented and fully impregnated by and enclosed within said matrix material but in spaced relation across the thickness of said sheet, each said mat comprising randomly oriented strands of continuous glass fibers and randomly intermingled discontinuous individual glass fibers, said fibers being interbonded in integrated relation in their respective mats by a thermosetting resinous binding agent, each said mat also including a nailing zone comprising a concentration of continuous glass fiber strands located in a portion of the sheet in which nailing is generally effected to secure the sheet to surfaces to be protected, said mats being disposed immediately adjacent the top-most and bottom-most surfaces of said matrix respectively to reinforce said surface, and a layer of granules of mineral material set in the top-most reinforced surface of asphalt of said sheet with said concentrated strips of randomly oriented glass fiber strands disposed in alignment with one immediately above the other.

7. In combination in a roofing sheet unit an exposed upper surface comprising a weathering asphalt extending at least partially through the thickness of said sheet, and a coextensive relatively thin integral porous mat of randomly oriented textile strands of continuous glass fibers disposed in fully impregnated relation within said asphalt below but immediately adjacent the exposed upper surface of the sheet to reinforce said upper surface, and granules of mineral material set in said exposed reinforced asphalt surface.

8. In combination in a roofing sheet unit an exposed upper surface comprising a weathering asphalt material extending at least partially through the thickness of said sheet, a coextensive relatively thin integrated porous mat of randomly oriented discontinuous individual fibers and randomly oriented textile strands of continuous glass fibers both interbonded in integrated relation by a thermosetting binder agent, said mat being disposed within said weathering asphalt material in fully impregnated relation by said asphalt below but immediately adjacent the exposed upper surface of the sheet to reinforce said upper surface, and a layer of granules of mineral material set in said exposed reinforced asphalt surface of the sheet.

9. A continuous method of making a composite self-integrated roofing sheet unit comprising coating the under surface and impregnating a continuously moving thin porous mat of reinforcing fibers with a hot asphaltic material, advancing and forcefully cooling the coated mat to a solid nonporous condition to form a carrier web for additional asphaltic material, depositing a relatively thick layer of hot asphaltic material in a given zone over the advancing cooled coated mat, introducing a second thin mat of reinforcing fibers over and into the hot exposed major surface of the layer of hot material on the cooled coated mat, the hot material deposited on the thin cooled mat being at such temperature and the cooled coated mat being cooled to a degree such that the hot material deposited on the cooled mat will not melt therethrough.

10. In the method of producing a self-integrated composite sheet unit material the steps of integrating two thin porous reinforcing mats with a relatively thick intermediate layer of heat-softenable core material, comprising heat-softening the core material, coating and impregnating the lower-most of said mats with such heat-softened core material to form a carrier web, thereafter cooling the coated and impregnated mat to a solid nonporous condition of the coating, moving the carrier web into a core deposition zone, combining in said zone the relatively thick intermediate layer of core material in heat-softened condition and the thin upper mat with the carrier web comprising the cooled lower coated mat, and cooling the composite sheet prior to the cooled coating material on the lower mat of the composite having time to be melted through by said heat-softened core material.

11. The method of making a self-integrated composite weather protective sheet unit which comprises moving longitudinally a thin lower glass fiber mat, impregnating and coating a heat-softened bitumen on such lower mat, during continued longitudinal movement of such lower mat coated with the bitumen, cooling the coated mat to a condition of solidification of the bitumen, depositing and spreading an additional amount of bitumen in heat-softened condition as a relatively thick layer on said cooled coated lower mat of glass fibers, covering the added soft bitumen with a thin upper porous mat of glass fibers, consolidating the intermediate bitumen and upper mat by applying pressure to the lower mat and upper mat and thus forming a composite sheet, depositing and spreading a relatively thin upper layer of bitumen in heat-softened condition over said thin upper mat, applying pressure to the upper and lower exposed surfaces of the composite sheet so formed to establish the thickness thereof, and to press said upper layer of bitumen and upper web into reinforcing relation of the upper web for the upper exposed surface applying granules of mineral material to the upper exposed bitumen surface of the composite sheet, setting the granular mineral material under pressure in the reinforced upper exposed surface of the sheet, removing non-set granules of the mineral material, and gradually cooling the granuled sheet to a dimensionally stable condition.

12. The method of making a self-integrated composite weather protective sheet unit comprising moving longitudinally a thin lower glass fiber mat, impregnating and coating a heat-softened asphalt on such lower mat during continued longitudinal movement of such lower bitumen coated mat, removing excesses of asphalt from the underside of such mat, forcefully cooling the coated mat to a condition of solidification of the asphalt, depositing and spreading an additional amount of asphalt in heat-softened condition as a relatively thick layer on said cooled coated lower mat of glass fibers, covering the added soft bitumen with a thin upper mat of glass fibers, consolidating the intermediate asphalt and upper mat by applying pressure to the lower mat and upper mat and thus forming a composite sheet, depositing and spreading a relatively thin upper layer of heat-softened asphalt over said thin upper mat, applying pressure to the upper and lower exposed surfaces of the composite sheet so formed such pressure being applied so as to press said upper layer of bitumen and upper mat into a reinforcing relation of the upper mat for the upper exposed surface, again removing any asphalt excess on the underside of the lower mat of the composite sheet, applying granules of mineral material to the upper exposed asphalt surface of the composite sheet, setting the granular mineral material under pressure in the upper exposed asphalt surface, removing non-set granules of the mineral material, and gradually cooling the granuled sheet to a stable condition.

(References on following page)

References Cited by the Examiner

UNITED STATES PATENTS

| | | | |
|---|---|---|---|
| 1,325,546 | 12/1919 | Wardell | 154—51 |
| 1,436,914 | 11/1922 | Seigle | 154—51 |
| 1,788,121 | 1/1931 | Overbury | 154—51 |
| 1,790,178 | 1/1931 | Sutherland | 161—124 |
| 2,162,687 | 6/1939 | Fisher | 154—51 X |
| 2,212,122 | 8/1940 | Miller | 154—51 |
| 2,662,044 | 12/1953 | Morrison et al. | |
| 2,688,580 | 9/1954 | Fingerhut. | |
| 2,695,257 | 11/1954 | Castellani | 154—51 |
| 2,731,066 | 1/1956 | Hogendobler et al. | |
| 2,771,387 | 11/1956 | Kleist et al. | 161—202 |
| 2,836,221 | 5/1958 | Bove | 154—51 |
| 2,875,503 | 3/1959 | Frickert et al. | 156—181 |

EARL M. BERGERT, *Primary Examiner.*

CARL F. KRAFFT, ALEXANDER WYMAN,
*Examiners.*